(12) United States Patent
Banerjee et al.

(10) Patent No.: US 11,588,884 B2
(45) Date of Patent: Feb. 21, 2023

(54) UTILIZING NETWORK ANALYTICS FOR SERVICE PROVISIONING

(71) Applicant: Cisco Technology, Inc., San Jose, CA (US)

(72) Inventors: Ayan Banerjee, Fremont, CA (US); Nataraj Batchu, Sunnyvale, CA (US); Varun Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 2 days.

(21) Appl. No.: 16/565,048

(22) Filed: Sep. 9, 2019

(65) Prior Publication Data

US 2021/0075853 A1 Mar. 11, 2021

(51) Int. Cl.
| | |
|---|---|
| G06F 9/455 | (2018.01) |
| G06F 9/50 | (2006.01) |
| H04L 43/0882 | (2022.01) |
| H04L 43/16 | (2022.01) |
| H04L 67/51 | (2022.01) |
| H04L 67/1008 | (2022.01) |
| H04L 47/80 | (2022.01) |
| H04L 45/745 | (2022.01) |

(52) U.S. Cl.
CPC ...... *H04L 67/1008* (2013.01); *G06F 9/45558* (2013.01); *G06F 9/5077* (2013.01); *H04L 43/0882* (2013.01); *H04L 43/16* (2013.01); *H04L 45/74591* (2022.05); *H04L 47/805* (2013.01); *H04L 67/51* (2022.05); *G06F 2009/45595* (2013.01)

(58) Field of Classification Search
CPC .......... G06F 2009/4557; G06F 9/5077; G06F 2009/45575; H04L 67/1008
USPC ......................................... 709/224
See application file for complete search history.

(56) References Cited

U.S. PATENT DOCUMENTS 10,356,005 B1 * 7/2019 Esam ................ H04L 41/083
10,587,529 B1 * 3/2020 Krishnaswamy ....... H04L 47/76
(Continued)

OTHER PUBLICATIONS

The PCT Search Report and Written Opinion dated Nov. 25, 2020 for PCT application No. PCT/US20/49690, 16 pages.
(Continued)

*Primary Examiner* — Tonia L Dollinger
*Assistant Examiner* — Jonathan A Sparks
(74) *Attorney, Agent, or Firm* — Lee & Hayes, P.C.

(57) ABSTRACT

This disclosure describes techniques for collecting network parameter data for network switches and/or physical servers and provisioning virtual resources of a service on physical servers based on network resource availability. The network parameter data may include network resource availability data, diagnostic constraint data, traffic flow data, etc. The techniques include determining network switches that have an availability of network resources to support a virtual resource on a connected physical server. A scheduler may deploy virtual machines to particular servers based on the network parameter data in lieu of, or in addition to, the server utilization data of the physical servers (e.g., CPU usage, memory usage, etc.). In this way, a virtual resource may be deployed to a physical server that has an availability of the server resources, but also is connected to a network switch with the availability of network resources to support the virtual resource.

20 Claims, 7 Drawing Sheets

(56) References Cited

U.S. PATENT DOCUMENTS

| | | | |
|---|---|---|---|
| 10,623,319 B1* | 4/2020 | Talnikov | H04L 67/1031 |
| 10,757,366 B1* | 8/2020 | Kwatra | G06F 11/3423 |
| 2011/0103393 A1* | 5/2011 | Meier | H04W 28/08 |
| | | | 370/401 |
| 2011/0225277 A1* | 9/2011 | Freimuth | G06F 9/45558 |
| | | | 709/223 |
| 2011/0276982 A1* | 11/2011 | Nakayama | H04L 67/1029 |
| | | | 718/105 |
| 2012/0059934 A1* | 3/2012 | Rafiq | H04L 67/1002 |
| | | | 709/225 |
| 2012/0096473 A1* | 4/2012 | Durham | G06F 9/5077 |
| | | | 718/105 |
| 2015/0074262 A1* | 3/2015 | Antony | H04L 45/22 |
| | | | 709/224 |
| 2016/0011894 A1 | 1/2016 | Reddy et al. | |
| 2017/0126790 A1* | 5/2017 | Mortsolf | H04L 47/125 |
| 2018/0191607 A1* | 7/2018 | Kanakarajan | G06F 9/5077 |
| 2019/0028352 A1 | 1/2019 | Rao et al. | |
| 2019/0028400 A1* | 1/2019 | Kommula | G06F 9/5088 |
| 2019/0081959 A1 | 3/2019 | Yadav et al. | |
| 2020/0236159 A1* | 7/2020 | Shang | H04L 67/101 |

OTHER PUBLICATIONS

The International Preliminary Report on Patentability for PCT Application No. PCT/US20/49690, dated Mar. 17, 2022.

\* cited by examiner

400 →

```
┌─────────────────────────────────────────────────────────────────────┐
│ DETERMINE THAT A VIRTUAL COMPUTING RESOURCE IS TO BE PROVISIONED ON A│
│   SERVER, THE VIRTUAL COMPUTING RESOURCE CONFIGURED TO EXECUTE AN   │
│                         INSTANCE OF A SERVICE                        │
│                                 402                                  │
└─────────────────────────────────────────────────────────────────────┘
                                   ↓
┌─────────────────────────────────────────────────────────────────────┐
│  OBTAIN, FROM A FIRST NETWORK SWITCH, FIRST NETWORK PARAMETER DATA  │
│   ASSOCIATED WITH A NETWORK RESOURCE OF THE FIRST NETWORK SWITCH,   │
│    WHEREIN THE FIRST NETWORK SWITCH IS CONNECTED TO A FIRST SERVER  │
│                                 404                                  │
└─────────────────────────────────────────────────────────────────────┘
                                   ↓
┌─────────────────────────────────────────────────────────────────────┐
│   OBTAIN, FROM A SECOND NETWORK SWITCH, SECOND NETWORK PARAMETER    │
│   DATA ASSOCIATED WITH THE NETWORK RESOURCE OF THE SECOND NETWORK   │
│   SWITCH, WHEREIN THE SECOND NETWORK SWITCH IS CONNECTED TO A SECOND│
│                                SERVER                                │
│                                 406                                  │
└─────────────────────────────────────────────────────────────────────┘
                                   ↓
┌─────────────────────────────────────────────────────────────────────┐
│  DETERMINE THAT THE FIRST NETWORK SWITCH IS LESS CONSTRAINED FOR THE │
│  NETWORK RESOURCE THAN THE SECOND NETWORK SWITCH BASED AT LEAST IN   │
│   PART ON THE FIRST NETWORK PARAMETER DATA AND THE SECOND NETWORK    │
│                            PARAMETER DATA                            │
│                                 408                                  │
└─────────────────────────────────────────────────────────────────────┘
                                   ↓
┌─────────────────────────────────────────────────────────────────────┐
│  DETERMINE THAT THE VIRTUAL COMPUTING RESOURCE IS TO BE PROVISIONED  │
│ ON THE FIRST SERVER BASED AT LEAST IN PART ON THE FIRST NETWORK SWITCH│
│    BEING LESS CONSTRAINED FOR THE NETWORK RESOURCE THAN THE SECOND   │
│                            NETWORK SWITCH                            │
│                                 410                                  │
└─────────────────────────────────────────────────────────────────────┘
```

FIG. 4

UTILIZING NETWORK ANALYTICS FOR SERVICE PROVISIONING

TECHNICAL FIELD

The present disclosure relates generally to orchestrating the provisioning of instances of services across physical servers at locations that improve performance of the services.

BACKGROUND

Cloud computing provides users with access to computing resources to fulfill users' computing resource needs. In some examples, service providers can manage and provide cloud computing resources to users to fulfill their needs without the users having to invest in and maintain their own computing infrastructure. Cloud computing often involves the use of networks of data centers which house servers, routers, and other devices that provide computing resources to users such as compute resources, networking resources, storage resources, database resources, application resources, and so forth. Users may be allocated portions of the computing resources using virtualization technology that remain available for peak demands of the users. The virtualized portions, or virtualized networks, of computing resources may be scaled up (or down) according to the computing needs of a given user without the need to maintain excess computing capacity. For example, an online retailer can scale a virtualized network of computing resources to meet increased demand during the holiday shopping season without having to maintain the underlying physical computing infrastructure used to provide the retailer's online presence.

To support a service (or application) using cloud computing, various types of schedulers are utilized to automate deployment, scaling, and operations of the virtual computing resources (or "virtual resources") across physical servers in a cloud computing network. To effectively orchestrate the virtual resources, the schedulers may track what virtual resources have been placed on what physical servers in order to determine where to spin up or place new virtual resources. Additionally, the physical servers may run one or more software agents (or minions) locally that collect server utilization data for the physical server and provide the utilization data to the schedulers. Such server utilization data may be collected for server parameters such as central processing unit (CPU) usage, memory consumption, offload availability, solid-state drive (SSD) availability, and other server parameters. Schedulers may collect and utilize this server utilization data to determine how to orchestrate the placement of virtual resources.

For example, a scheduler may determine that a virtual resource is scheduled to be spun up, and further determine the resource utilization requirements for that virtual resource. The scheduler may then identify a physical server that has availability of server resources (e.g., CPU availability, memory availability, storage availability, etc.) to adequately support the virtual resource. The virtual resource may then be deployed to the physical server that has availability to support the virtual resource. Thus, while schedulers may provision services intelligently in some respects, the provisioning of services may still suffer from inefficiencies.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for components of a cloud computing network to deploy a virtual resource on a server based at least in part on network parameter data.

DESCRIPTION OF EXAMPLE EMBODIMENTS

Overview

Figure 1:
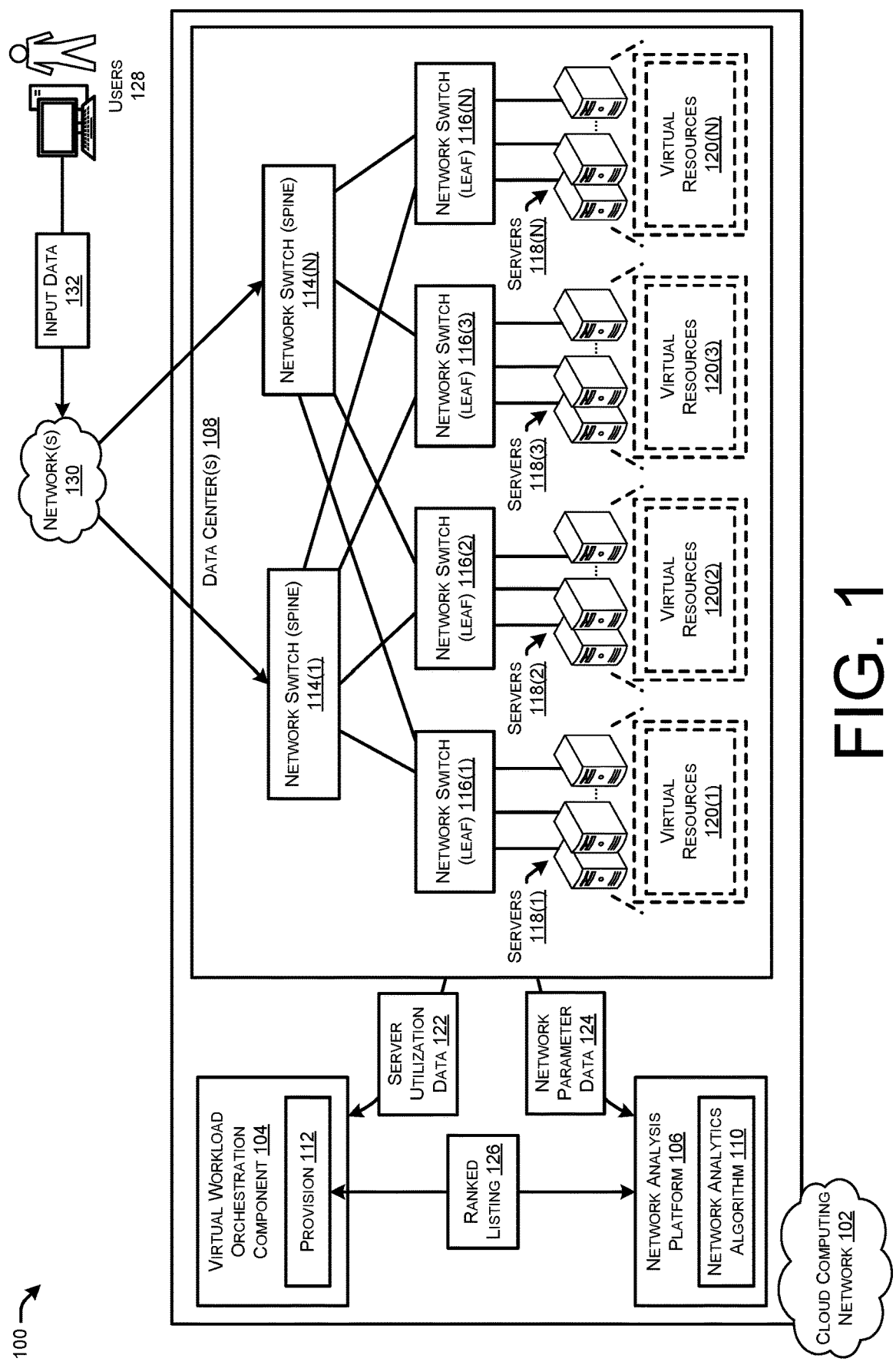
FIG. 1 illustrates a system-architecture diagram of an example environment in which a network analysis platform receives network parameter data for network switches and servers, and determines a server on which to deploy a virtual resource using the network parameter data.

This disclosure describes a method of utilizing network analytics for cloud computing networks to provision instances of services across physical servers at locations with availability of network resources to support the network requirements of the services. The method includes determining that a virtual computing resource is to be provisioned on a server in the cloud computing network. Further, the method includes obtaining network parameter data for a first network switch connected to a first server, and a second network switch connected to a second server. The network parameter data may be associated with a network resource of the first network switch and second network switch. Additionally, the method includes determining that the first network switch is less constrained for the network resource than the second network switch. The method further includes determining that the virtual computing resource is to be provisioned on the first server based at least in part on the first network switch being less constrained for the network resource than the second network switch.

Additionally, the techniques described herein may be performed by a system and/or device having non-transitory computer-readable media storing computer-executable instructions that, when executed by one or more processors, performs the method described above.

Example Embodiments

The usefulness of server virtualization, from virtual machines to containers to storage, has resulted in a rapid increase in cloud computing and data centers. Using virtualization technologies, a single physical server can host multiple applications, operating systems, and/or data storage instances using server virtualization (e.g., a software layer called a hypervisor). In this way, multiple applications or processes may execute on a single physical server to drive up overall hardware utilization of that physical server. Various virtualization technologies are utilized by cloud computing systems. Often, cloud computing systems may utilize multiple virtual machines running workloads on individual physical servers. Additionally, or alternatively, cloud computing systems may utilize application clustering (or software clustering) where multiple physical servers are turned into a cluster of physical servers, or a group of servers, that act like a single system. Each of the servers in the physical cluster collectively run or support a same application or service, referred to herein as a clustered application. For example, virtual machines (VMs) and/or containers may run individual instances of a service or application to provide a distributed clustered service or application. A distributed clustered application that runs on a cluster of physical servers provide various advantages, such as increased availability, increased scalability, and failover protections.

Thus, a cloud computing network can support one or more services (also referred to herein as "applications") for one or more users. The services may each be allocated exclusive use of physical servers in the cloud computing network (or "single tenant"), or share use of physical servers with instances of other services (or "multi-tenant"). In any architecture, and using any type of virtual resource, the number of virtual instances of a service provisioned in the cloud computing network may scale to meet increased demand of the service. To orchestrate the provisioning of services, schedulers are utilized to automate deployment, scaling, and operations of the virtual resources of the service deployed across physical servers of the cloud computing network.

As noted above, schedulers collect and analyze server utilization data for server parameters of the various physical servers, such as central processing unit (CPU) usage, memory consumption, offload availability, solid-state drive (SSD) availability, and other server parameters. The schedulers may utilize this server utilization data to determine how to orchestrate the placement of virtual resources. For example, a scheduler may determine that a virtual resource is scheduled to be spun up, and further determine the resource utilization requirements for that virtual resource. The scheduler may then identify a physical server that has availability of server resources (e.g., CPU availability, memory availability, storage availability, etc.) to adequately support the virtual resource. The virtual resource may then be deployed to the physical server that has availability to support the virtual resource. In this way, schedulers may deploy virtual resources on servers that have availability across various hardware-based server parameters (e.g., CPU, memory, storage, etc.).

While schedulers and virtualization techniques efficiently drive up the utilization of underlying resources of servers (e.g., CPU, memory, storage/disk, etc.), the volume of east-west traffic in data centers may increase due to the communication between the increasing number virtual resources on the physical servers. The increased traffic on networks in data centers may result in various inefficiencies in network resource utilization, which may in turn result in undesirable issues that negatively impact network performance, such as packet drops, latency, and so forth. Although various data center architectures are utilized to help compensate for the negative impacts on network performance (e.g., leaf-spine architectures), various issues exist in communication networks due to the communication traffic between virtual resources provisioned in data centers of cloud computing networks.

This disclosure describes techniques for collecting network parameter data for network switches and/or physical servers connected to the network switches, and provisioning virtual resources of a service on physical servers based on the network switches and/or physical servers having an availability of network resources to support the virtual resources. The network parameter data may include indications of availability of network resources of the network switches. Further, the network parameter data may include indications of diagnostic constraints for network resources of the network switches (and any violations thereof), flow data indicating amounts of traffic between the network switches and the physical servers, and so forth. The techniques described herein include determining network switches (and/or connected physical servers) that have an availability of network resources to support the deployment of a virtual resource on a physical server. In some examples, a scheduler may determine to deploy virtual machines to particular physical servers using the network parameter data in lieu of, or in addition to, the use of the server utilization data of the physical servers. In this way, a virtual resource may be deployed to a physical server that has not only the availability of not only the hardware resources to support the virtual resource, but also has the availability (or is connected to a network switch with the availability) of network resources to support the virtual resource.

Generally, physical servers in a cloud computing network may execute software agents (or minions) that collect server utilization data for the individual servers indicating instantaneous, as well as average, usage for hardware resources of the physical servers. For instance, the server utilization data for the physical servers may include instantaneous and/or average values of CPU usage, memory usage, disk usage, and the like. Further, software agents may, in some examples, determine what portions of the overall usage values are attributable to the different virtual resources on the physical servers. The server utilization data may then be relayed back to a scheduler that is configured to analyze the server utilization data and determine which physical servers have hardware resource availability to support a virtual resource that is to be provisioned.

According to the techniques described herein, the cloud computing network may further include or be associated with a network analysis platform that is configured to collect and analyze various network parameter data indicating usage and availability of network resources for devices in the cloud computing network (e.g., servers, switches, routers, etc.). For example, the network analysis platform may communicate with network switches to collect the network parameter data. The network switches may be, in some examples, leaf switches such as top-of-rack (TOR) switches that are connected to a group of physical servers (e.g., 32 servers, 48 servers, etc.). The network switches may be configured to maintain various types of network parameter data that indicates availability of network resources used to support virtual resources deployed on the servers connected to the network switches.

The network switches may provide the network analysis platform with network parameter data indicating network resource data for the network switches. For instance, the network resource data may include indications (e.g., instantaneous values, average values, etc.) of network resources associated with the network switches, such as an availability of ternary content addressable memory (TCAM) on the network switches, entries in access control lists (ACLs) on the network switches, routing table entries in routing tables on the network switches, buffered memory on the network switches, etc. The network analysis platform may receive the network resource data from the network switches and store the network resource data for further analysis, such as in a time-series database.

The network switches may additionally, or alternatively provide the network analysis platform with other network parameter data including network diagnostic data indicating diagnostic constraints for network resources of the network switches (and/or any violations thereof), flow data indicating amounts of traffic between the network switches and the physical servers, and so forth. For instance, the network diagnostic data may indicate various network diagnostic constraints, and indications of violations of those constraints, such as indications of (i) a number of times memory constraint thresholds of the network switches were exceeded, (ii) a number of times interface error thresholds of the network switches were exceeded, (iii) a number of times buffer drop thresholds of the network switches were exceeded, (iv) a number of times quality of service (QoS) thresholds of the network switches were exceeded, etc.

Further, the network parameter data may include the flow data indicating amounts of traffic between the network switches and the physical servers. The flow data may indicate various information regarding how much traffic is flowing between switches and servers, such as maximum amounts of data that can flow on the links between the network switches and the server (e.g., 20 Gbps, 10 Gbps, etc.), instantaneous amounts of data flowing on the links, average amounts of data flowing on the links, peak values and low values for data amounts flowing on the links, and so forth. The network analysis platform may receive and store this flow data locally for further use in determining where to deploy virtual resources.

Thus, the network analysis platform may receive various network parameter data as described above, including one or more of network resource data, network diagnostic data, and/or network flow data. The network analysis platform may utilize the network parameter data to determine on which servers to deploy virtual resources. In some examples, the network analysis platform may rank the physical servers based on the network parameter data collected from their respective network switches and select the physical server with the highest ranking. The highest ranked physical server may generally correspond to the physical server that is associated with a network switch with the best availability across network resources that are utilized to support the virtual resource to be deployed.

In some examples, the network analysis platform may work in conjunction with a scheduler (or be included in a scheduler) to select physical servers on which to deploy virtual resources based on the server utilization data as well as the network parameter data. For example, the scheduler may determine, using the server utilization data, an initial ranked list of physical servers based on their availability to support a virtual resource with respect to availability of hardware resources of the server (e.g., CPU, memory, storage, etc.). The network analysis platform may receive this initial ranked list and re-order the rankings of the physical servers based on the network parameter data. For example, a particular server may be ranked highest on the list by the scheduler due to the availability of server resources, but the associated network switch may have low availability (e.g., near or at max capacity) for network resources to support a virtual resource. Accordingly, the network analysis platform may move the physical server down the ranked list, and may similarly move other physical servers up the ranked list, to generate a final ranked list of physical servers. In this way, the final ranked list of physical servers will indicate the servers that are most optimized, or have the most availability, with respect to server resources as well as network resources. The scheduler may then utilize the final ranked list of servers to select a physical server on which to deploy a virtual resource. In some examples, the scheduler may obtain the final ranked list of servers from the network analysis platform via an API call. For instance, the scheduler may call an API that requests the network analysis platform generate the final ranked list of servers and return the final ranked list. In some instances, the network analysis platform may determine the final ranked list of servers based on receiving the API request from the scheduler, and in other examples, the network analysis platform may continue to maintain the final ranked list of servers and have the final ranked list available to the scheduler via the API (or multiple APIs).

As described herein, a virtual resource can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to provisioning services over networks of devices using virtual resources. For instance, the techniques described herein may reduce the amount of dropped data, latency, and other issues experienced in networks due to lack of network resources. By deploying virtual resources to locations (e.g., servers) that have availability of network resources, or are connected to network switches with availability of network resources, the network communications performed by these servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 including a cloud computing network 102 that includes a virtual workload orchestration component 104 and a network analysis platform 106.

In some examples, computing resources of a cloud computing network 102 may be utilized by the virtual workload orchestration component 104 to instantiate, support, run, and/or execute virtual resources (e.g., virtual machines, containers, etc.). The cloud computing network 102 may comprise one or more data centers 108 that include various networking devices, such as spine network switches 114(1)-114(N), leaf network switches 116(1), and servers 118(1)-118(N) where N is any integer greater than "1." In some examples, the data centers 108 may be located across geographic areas, and the cloud computing network 102 may be a distributed network through which users (often customers) may interact via user devices to manage or otherwise interact with service provided by the cloud computing network 102.

The cloud computing network 102 may provide on-demand availability of computing system resources, such as data storage, computing power (e.g., CPU, GPU, etc.), networking, databases, etc., without direct active management by users. In some examples, the cloud computing network 102 may be managed and maintained by a service provider such that users do not have to invest in and maintain the computing infrastructure for their computing resource needs. Generally, a user may be provided access to, or allocated use of, a portion of the computing resources in the cloud computing network 102. The cloud computing network 102 may scale, such as by spinning up resources or spinning down resources, based on demand for the individual users. The portions of the cloud computing network 102 may be allocated using hardware virtualization such that portions of the cloud computing network 102 can be configured and managed by the user (e.g., security configuration, load balancing configuration, etc.). However, the cloud computing network 102 need not be managed by a service provider, and can be managed by any entity, including the user themselves that run the applications or services.

In some examples, a user, admin, customer, or other entity may request that one or more servers 118 in the cloud computing network 102 be grouped into a cluster where each server 118 is a cluster node. Generally, a cluster may refer to a group of servers 118 working together in a system or network to provide users with, among other benefits, higher availability of applications or services. Each node in the physical cluster may run or execute one or more virtual resources 120(1)-120(N), such as application containers, virtual machines, etc., that run an application, service, process, or the like. By running virtual resources 120 on different servers 118 or nodes, the cluster of servers 118 can reduce downtime and outages by allowing another server 118 to take over in the event of an outage. For instance, if one of these servers 118 experiences a service outage, the workload on that server 118 may be redistributed to another server 118 before any downtime is experienced by the client. In this way, the physical cluster may support applications and services with a higher level of availability, reliability, and scalability than a single server 118 offers.

Each server 118 (or node) may support one or more virtual resources 120. The virtual resources may each encapsulate the files, dependencies, libraries, etc., of an application or service to run on an operating system of a server 118. In some examples, a single physical server 118 may run multiple virtual resources 120 on the same operating system at the same time. In this way, the server 118 may run multiple virtual resources 120 that each run independent instances of the same application. However, in some instances the physical servers 118 may run one or more virtual machines where each virtual machine runs an independent instance of the application, service, or other process. The virtual resources 120 can generally run or support any service, application, clustered environment, and so forth.

The data centers 108 are illustrated as utilizing a leaf-spine architecture where each spine network switch 114 is connected to every leaf network switch 116 in the network fabric. Thus, no matter which leaf network switch 116 a server 118 is connected to, the server 118 crosses the same number of devices every time it connects to another server 118 (unless the other server 118 is on the same leaf 116). In some examples, the leaf-spine architecture may minimize latency and bottlenecks because each payload only travels one spine network switch 114 and another leaf network switch 116 to reach an endpoint. The spine switches 114 may have high port density and comprise the core of the architecture. The leaf-spine topology may be layer 2 or layer 3 depending on whether the links between the leaf and spine layer will be switched or routed. Although the data centers 108 are illustrated 108 as a leaf-spine architecture, any architecture known in the art may be utilized equally to implement the techniques described herein.

The techniques described herein include collecting various data, such as server utilization data 122 and network parameters data 124, and determine on which servers 118 to deploy virtual resources 120. The virtual workload orchestration component 104 may be an orchestration platform for virtual resources 120 that manages the provisioning of services or applications in a computing environment. The virtual workload orchestration component 104 may perform or manage tasks such as virtual resources 120 deployment, scaling, configuration, versioning, rolling updates, etc. The virtual workload orchestration component 104 may include or be a scheduler that manages services by deploying the virtual resources 120 to the servers 118. Generally, the scheduler attempts to match virtual resources 120 to suitable sets of resources on servers 118 according to server resource availability.

The virtual workload orchestration component 104 may collect various server utilization data 122 from the servers 118 in the data centers 108. The server utilization data 122 may indicate availability/usage of hardware resources of the servers. For instance, the server utilization data 122 may indicate central processing unit (CPU) usage, memory consumption, offload availability, solid-state drive (SSD) availability, and other server parameters. The server utilization data 122 may indicate this data as one or more of instantaneous values, average values over a collecting period, instantaneous/average percentages of usage versus maximum resources, and/or any other indication of server resource usage.

The virtual workload orchestration component 104 may utilize this server utilization data 122 to determine how to orchestrate the placement of virtual resources 118. For example, a scheduler may determine that a virtual resource 118 is scheduled to be spun up for a service (or migrated), and further determine the resource utilization requirements for that virtual resource 118. For instance, the virtual workload orchestration component 104 may store fingerprints that indicate average server utilization for the virtual resources 118 of difference services. The scheduler may then identify a server 118 that has availability of server resources (e.g., CPU availability, memory availability, storage availability, etc.) to adequately support the virtual resource 120. The virtual resource 120 may then be deployed to the physical server 118 that has availability to support the virtual resource 120. In this way, schedulers of the virtual workload orchestration component 104 may deploy virtual resources 120 on servers 118 that have availability across various hardware-based server parameters (e.g., CPU, memory, storage, etc.).

As noted above, the virtual workload orchestration component 104 may only contemplate server utilization data 122 in order to efficiently drive up the utilization of underlying resources of the servers 118 (e.g., CPU, memory, storage/ disk, etc.). However, this may result in the volume of east-west traffic in data centers 108 increasing due to the communication between the increasing number virtual resources 120 on the servers 118. The increased traffic on networks in data centers 108 may result in various inefficiencies in network resource utilization, which may in turn result in undesirable issues that negatively impact network performance, such as packet drops, latency, and so forth.

Accordingly, the cloud computing network 102 may further include a network analysis platform 106 configured to collect network parameter data 124 for the network switches 114/116 and/or servers 118 connected to the network switches 114. Generally, the network parameter data 124 may include data indicating availability or usage of any type of network resources needed to support a virtual resource 120. In some examples, the network switches 116 may provide the network parameter data 124 to the network analysis platform 106. For example, the network switches 116 may periodically, continuously, upon receiving a request, etc., provide the network analysis platform 106 with the network parameter data 124. The network parameter data 124 may include network resource data indicating availability of network resources for the switches 116 and/or servers 18, diagnostic constraint data indicating violations of diagnostic thresholds set for network resources of the switches 116 and/or servers 118, and/or flow data indicating amounts and spikes of network traffic between the switches 114/116 and/or servers 118.

The network resource data 124 may include indications (e.g., instantaneous values, average values, etc.) of network resources associated with the network switches 114, such as an availability or usage of ternary content addressable memory (TCAM) on the network switches 114, entries in access control lists (ACLs) on the network switches 114, routing table entries in routing tables on the network switches 114, buffered memory on the network switches 114, etc. The network analysis platform 106 may receive the network resource data 124 from the network switches 114 and store the network resource data 124 for further analysis, such as in a time-series database.

The network switches 114 may additionally, or alternatively provide the network analysis platform 106 with other network parameter data 124 including network diagnostic data indicating diagnostic constraints for network resources of the network switches 114 (and/or any violations thereof). For instance, the network diagnostic data may indicate various network diagnostic constraints, and indications of violations of those constraints, such as indications of a number of times memory constraint thresholds of the network switches 114 were exceeded, a number of times interface error thresholds of the network switches 114 were exceeded, a number of times buffer drop thresholds of the network switches 114 were exceeded, a number of times QoS thresholds of the network switches 114 were exceeded, etc.

Further, the network parameter data 124 may include the flow data indicating amounts of traffic between the network switches 116 and the servers 118. The flow data may indicate various information regarding how much traffic is flowing between switches 116 and servers, such as maximum amounts of data that can flow on the links between the network switches 116 and the servers 118 (e.g., 20 Gbps, 10 Gbps, etc.), instantaneous amounts of data flowing on the links, average amounts of data flowing on the links, peak values and low values for data amounts flowing on the links, and so forth. The network analysis platform 106 may receive and store this flow data locally for further use in determining where to deploy virtual resources 120.

In some examples, the network analysis platform 106 and the virtual workload orchestration component 104 may deploy a virtual resource 120 to a server 118 based on the network parameter data 124 without considering the server utilization data 122. However, in some examples a virtual resource 120 may be deployed based on both the sever utilization data 122 and the network parameter data 124. In such examples, the network analysis platform 106 may work in conjunction with the virtual workload orchestration component 104 (e.g., a scheduler) to select servers 118 on which to deploy virtual resources 120 based on the server utilization data 122 as well as the network parameter data 124. For example, the virtual workload orchestration component 104 may determine, using the server utilization data 122, an initial ranked listing 126 of servers 118 based on their availability to support a virtual resource 120 with respect to availability of hardware resources of the server 118 (e.g., CPU, memory, storage, etc.). The network analysis platform 106 may receive this initial ranked list 126 and re-order the rankings of the servers 118 based on the network parameter data 124. For instance, the virtual workload orchestration component 104 may include a provision 112 that allows the network analysis platform 106 to modify the ranked listing 126 determined by the virtual workload orchestration component 104.

As an example, a particular server 118 may be ranked highest on the listing 126 by the virtual workload orchestration component 104 due to the availability of server resources on that server 118 (e.g., CPU, memory, etc.), but the associated network switch 116 may have low availability (e.g., near or at max capacity) for network resources to support a virtual resource 120. Accordingly, the network analysis platform 106 may move the server 118 down the ranked list 126, and may similarly move other servers 118 up the ranked list 126, to generate a final ranked list 126 of servers 126. In this way, the final ranked listing 126 of servers 118 will indicate the servers 118 that are most optimized, or have the most availability, with respect to server resources as well as network resources. The virtual workload orchestration component 104 may then utilize the final ranked listing 126 of servers 118 to select a server 118 on which to deploy a virtual resource 120.

The network analysis platform 106 may include a network analysis algorithm 110 that determines how to rank the servers 118 based on the network parameter data 124, and/or how to modify the ranked listing 126 based on the network parameter 124. The network analysis algorithm 110 may analyze the various network parameter data 124 and assign weights or coefficients to the various network parameter data 124. For instance, the network analysis algorithm 110 may analyze the network resources, diagnostic constraints, and flow data and assign coefficients to each of those categories. For example, the network analysis algorithm 110 may analyze the network constraints and determine a weighting value based on availability of the network resources for a network switch 116 (e.g., 0.9 weighting factor indicates availability and 0.2 indicates low availability). Similarly, the network analysis algorithm 110 may assign a weighting value to the diagnostic constraints of the network switch 116 and assign a weighting value based on how many times a threshold of the diagnostic constraint has been violated (e.g., assign 0.9 based on a low number of interface errors, assign a 0.2 based on a high number of memory usage that exceeds a diagnostic memory threshold, etc.). Further, the network analysis algorithm 110 may assign weighting values based on the amount of flow data and/or spikes in the flow data with respect to the maximum amount of data that can flow through the link. For instance, the network analysis algorithm 110 may assign a weighting value of 0.8 to a server 118 that has a link to a network switch 116 that permits 20 Gbps and is utilizing 4 Gbps. Conversely, the network analysis algorithm 110 may assign a weighting value of 0.2 to a server 118 that has a link to a network switch 116 that permits 20 Gbps and is utilizing 16 Gbps.

The network analysis platform 106 may then compute an overall weighting score for each server 118 based on the weighting scores determined for the network resources, diagnostic constraints, and flow data. The network analysis platform 106 may utilize the overall weighting score to determine the rankings for the servers 118, and/or to re-rank the ranked listing 126 of servers 118 received from the virtual workload orchestration component 104. In some examples, the network analysis platform 106 may maintain the re-ranked listing 126 of servers 118 (e.g., periodically, continuously, etc.). In this way, the network analysis platform 106 may have the re-ranked listing 126 of servers readily available for the virtual workload orchestration component 104 by maintaining the re-ranked listing 126. However, in some examples the network analysis platform 106 may re-rank the listing 126 responsive to receiving a request (e.g., API) depending on the configuration implemented by the cloud computing network 102.

After determining the ranking of servers 118, the virtual workload orchestration component 104 may deploy a virtual resource 120 based on the ranked listing 126. The virtual workload orchestration component 104 may determine the ranked listing 126 based on the network parameter data 124, or based on the server utilization data 122 in conjunction with the network parameter data 124. The virtual workload orchestration component 104 may then deploy the virtual resource 120 to the top ranked server 118 in the ranked listing 126, or one of the top ranked servers 118 in the ranked listing 126.

Generally, the number of virtual resources 120 may scale based on a number of users 128 interacting with the clustered application. The users 128 may comprise one or more of individual users, groups of users, organizations, businesses, or other entities that interact with the cloud computing network 102 via respective user devices. The user devices may be any type of computing device capable of connecting to the cloud computing network 102 via a suitable data communications network 130 such as, but not limited to, a laptop or desktop computer, a tablet computing device, a server computer, a television, or a mobile telephone. Administrative users employed by the operator of the cloud computing network 102, such as administrators managing the operation of the cloud computing network 102, might also connect with, manage, and utilize resources provided by the service provider network 102 in a similar fashion.

The users 128 may provide input data 132 via the network (s) 130 to interact with the service that is supported by the virtual resources 120 running on the servers 118. For example, the users 128 may submit requests to process data, retrieve data, store data, and so forth such that virtual resources 120 are spun up or spun down to process the requests based on demand.

In some examples, the network analysis platform 106 may be included in the virtual workload orchestration component such that the techniques described herein may be performed by a single system, entity, device, component, etc. However, the techniques are equally applicable using any number of devices, components, services, processes, etc., based on the infrastructure determined to implement the provisioning of services using virtual resources 120 running in data centers 108 and on servers 118.

Figure 2:
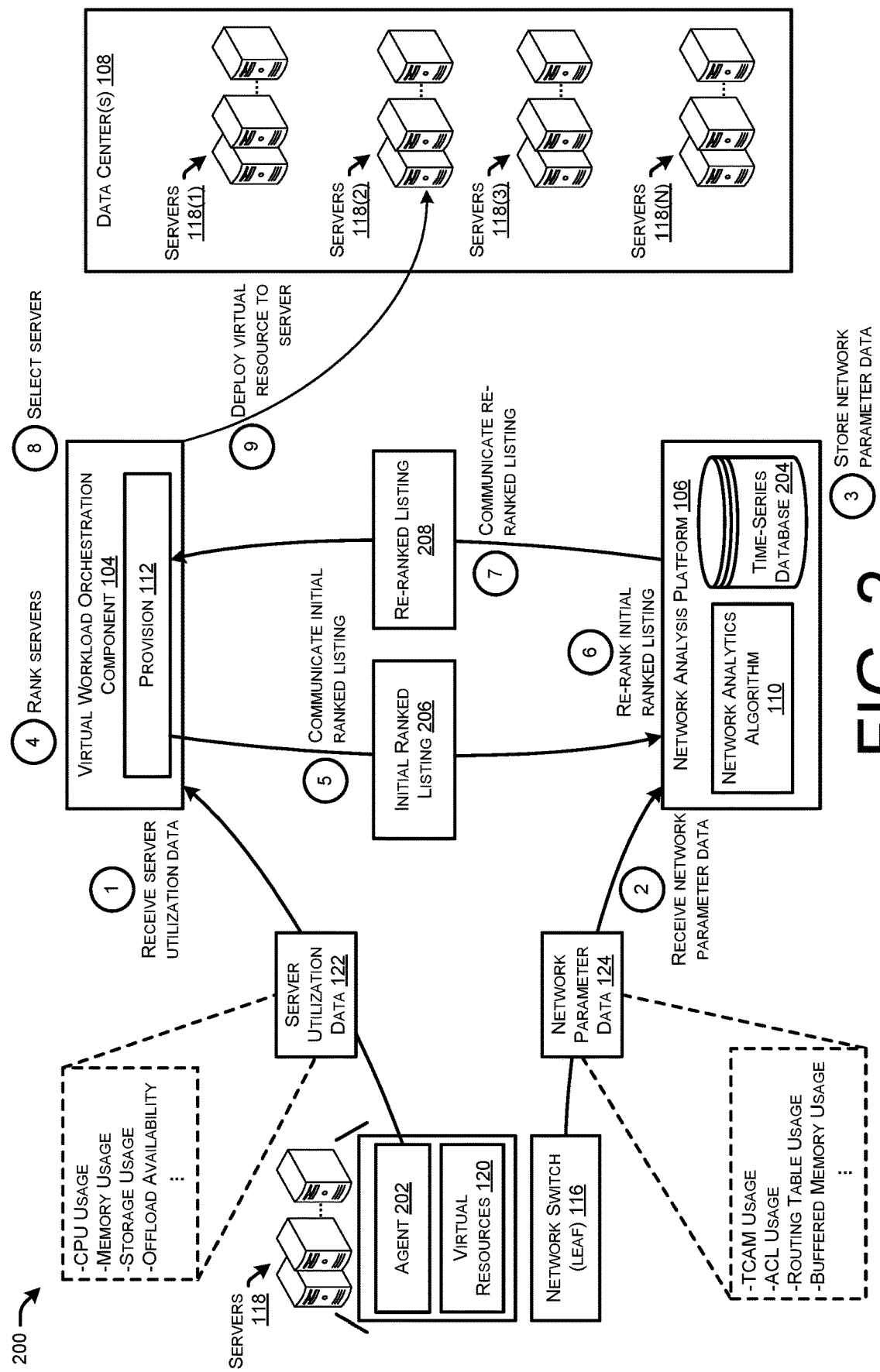
FIG. 2 illustrates a component diagram of an example flow for a virtual workload orchestration component and a network analysis platform to deploy a virtual resource on a server based on server utilization data and network parameter data.

FIG. 2 illustrates a component diagram 200 of an example flow for a virtual workload orchestration component 104 and a network analysis platform 106 to deploy a virtual resource 120 on a server 118 based on server utilization data 132 and network parameter data 124.

In some examples, the servers 118 may each run one or more software agents 202 (or minions) that collect various data described herein. For instance, the agent 202 may monitor and collect usage data included in the server utilization data 122 indicating the hardware resources of the servers 118 being utilized by the virtual resources 120. The agent 202 may further be configured to provide the server utilization data 122 to the virtual workload orchestration component 104.

At "1," the agent 202 may provide the server utilization data 122 to the virtual workload orchestration component 104. The server utilization data 122 may include indications (e.g., values, percentages, etc.) of CPU usage, memory usage, storage usage, offload availability, etc.

At "2," the network switch 116 may provide network parameter data 124 to the network analysis platform 106. The network parameter data 124 may include TCAM usage, ACL usage, routing table usage, buffered memory usage, etc. The steps "1" and "2" may occur contemptuously, continually, and/or at different times.

At "3," the network analysis platform 106 may store the network parameter data 124 in a time-series database 204 that indicates usage over time for each server 118. In this way, historical network usage data may be stored in the time-series database 204 to determine how the servers 118 act overtime to support the virtual resources 120.

At "4," the virtual workload orchestration component 104 may rank the servers using the server utilization data 122. For instance, the virtual workload orchestration component 104 may rank the servers 118 based on the server utilization data 122 according to various techniques, such as by weighting one or more the dimensions of server usage based on availability of the server resources.

At "5," the virtual workload orchestration component 104 may provide an initial ranked listing 206 of the servers 118 to the network analysis platform 106, such as by the provision 112 (e.g., API call). At "6," the network analysis platform 106 may re-rank the initial ranked listing of servers 118 based at least in part on the network parameter data 124 according to the techniques described herein. At "7," the network analysis platform 106 may communicate the re-ranked listing 208 of the servers 118 to the virtual workload orchestration component 104. At "8," the virtual workload orchestration component 104 may select a server 118 on which to provision the virtual workload 120 based at least in part on the re-ranked listing 208. At "9," the virtual workload orchestration component 104 may cause the virtual resource 120 to be deployed to the server 118 selected based at least in part on the re-ranked listing 208.

Figure 3:
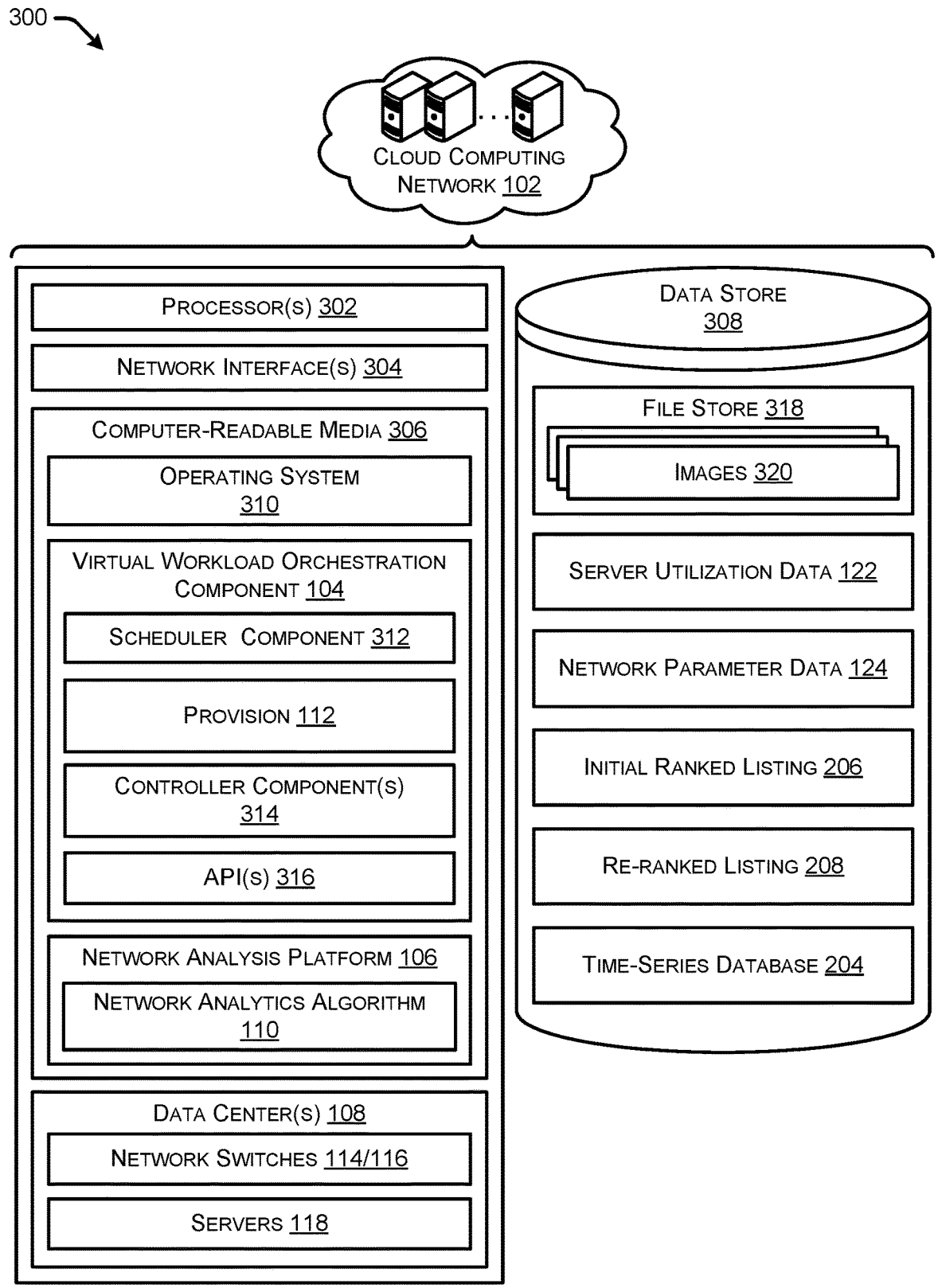
FIG. 3 illustrates a component diagram illustrating example components of a cloud computing network.

FIG. 3 illustrates a component diagram 300 that depicts example components of a cloud computing network 102. As illustrated, the cloud computing network 102 may include one or more hardware processors 302 (processors) configured to execute one or more stored instructions. The processor(s) 302 may comprise one or more cores. Further, the cloud computing network 102 may include one or more network interfaces 304 configured to provide communications between the cloud computing network 102 and other devices, such as the user device(s), and communications between devices in the cloud computing network 102 (e.g., servers 118, network switches 114/116, load balancers, routers, etc.). The network interfaces 304 may include devices configured to couple to personal area networks (PANs), wired and wireless local area networks (LANs), wired and wireless wide area networks (WANs), and so forth. For example, the network interfaces 304 may include devices compatible with Ethernet, Wi-Fi™, and so forth.

The cloud computing network 102 may include computer-readable media 306 that stores one or more operating systems 310. The operating system(s) 310 may generally support basic functions of the devices in the cloud computing network 102, such as scheduling tasks on the devices, executing applications on the devices, controlling peripheral devices, and so forth. The computer-readable media 306 may further store the virtual workload orchestration component 104 that is configured to, when executed by the processor(s) 302, perform at least the functions described herein. In addition to the provision 112, the virtual workload orchestration component 104 may further store a scheduler component 312, one or more controller components 314, and one or more APIs 316.

The controller components 314 may execute routine tasks to ensure the desired state of the virtual resources 120 match the observed state. For instance, the controller components 314 may determine that the correct number of virtual resources 120 are running for their respective cluster or group. The controller components 314 may identify the state of the servers 118 and respond when a server 118 goes down. The APIs 316 may generally serve as a foundation for a declarative configuration scheme for the virtual workload orchestration component 104.

The computer-readable media 306 may further store the instructions of the network analysis platform 106 configured to, when executed by the processor(s) 302, perform the techniques described herein. For instance, the network analytics algorithm 110 may execute to perform the techniques for determining which server 118 is most optimized to support a virtual resource 120 based on network parameter data 124 associated with network switches 114 and/or the servers 118 themselves.

The cloud computing network 102 may further include the data centers 108 described above, which include the network switches 114/66, servers 118, and/or other devices (e.g., load balancers, routers, etc.).

The cloud computing network 102 may include a data store 308 that is stored on a device of the cloud computing network 102, or across multiple devices of the cloud computing network 102. The data store may include a file store 318 that includes one or more images 320 that may comprise static files that include executable code to run an isolated process, such as an application container image, virtual machine image, database instance image, storage image, etc. The images 320 may comprise system libraries, system tools, and other platform settings a software program needs to run on a virtualized platform.

The data store 308 may further store the server utilization data 122, network parameter data 122, initial ranked listing 206, re-ranked listing 208, and the time-series database 204 as described herein.

Figure 5:
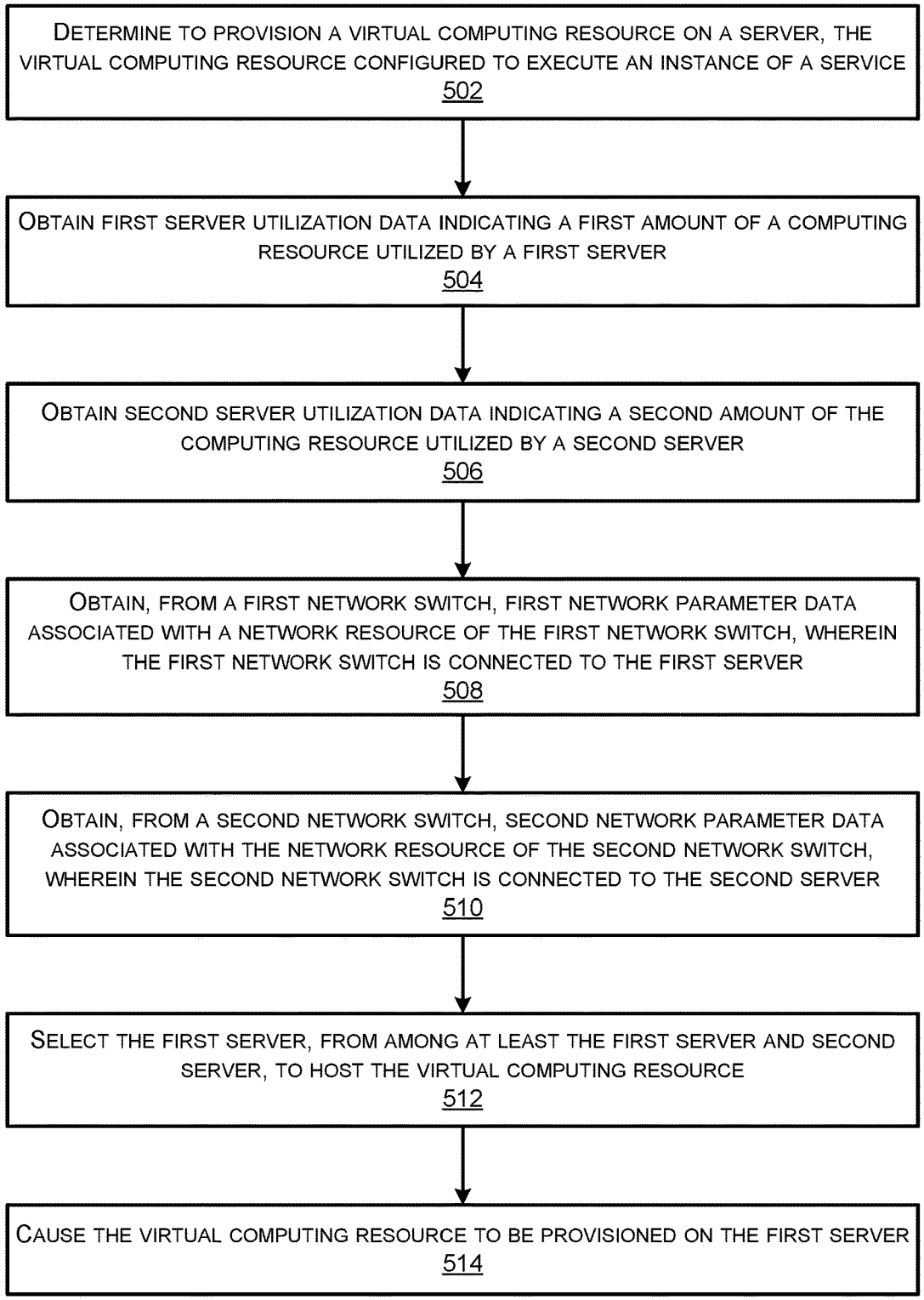
FIG. 5 illustrates a flow diagram of an example method for components of a cloud computing network to deploy a virtual resource on a server based on server utilization data and network parameter data.

FIGS. 4 and 5 illustrate flow diagrams of example methods 400 and that illustrate aspects of the functions performed at least partly by the cloud computing network 102 as described in FIGS. 1-3. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for components of a cloud computing network 102 to deploy a virtual resource 120 on a server 118 based at least in part on network parameter data 124. In some examples, the method 400 may be performed by a system comprising one or more processors 302 and one or more non-transitory computer-readable media 306 storing computer-executable instructions that, when executed by the one or more processors 302, cause the one or more processors 302 to perform the method 400.

At 402, the cloud computing network 102 may determine that a virtual computing resource 120 is to be provisioned on a server 118 where the virtual computing resource 120 is configured to execute an instance of a service (e.g., application). For instance, a virtual workload orchestration component 104 may receive a request, or determine based on demand, to spin up a virtual computing resource 120 of a server.

At 404, the cloud computing network 102 may obtain, from a first network switch 116(1), first network parameter data 124 associated with a network resource of the first network switch 116(1). The first network switch 116(1) may be connected to at least a first server 118(1).

At 406, the cloud computing network 102 may obtain, from a second network switch 116(2), second network parameter data 124 that may be associated with the network resource of the second network switch 116(2). The second network switch may be connected to a second server 118(2).

The first network parameter data 124 and the second network parameter data 124 may comprise at least one of first indications of availability of content addressable memory (CAM) on the first network switch 116(1) and the second network switch 116(2), second indications of availability of entries in access control lists (ACLs) on the first network switch 116(1) and the second network switch 116(2), third indications of availability of routing table entries in routing tables on the first network switch 116(1) and the second network switch 116(2), or fourth indications of availability of buffered memory on the first network switch 116(1) and the second network switch 116(2).

The first network parameter data 124 and the second network parameter data 124 may comprise at least one of first indications of a number of times memory constraint thresholds of the first network switch 116(1) and the second network switch 116(2) were exceeded, second indications of a number of times interface error thresholds of the first network switch 116(1) and the second network switch 116(2) were exceeded, third indications of a number of times buffer drop thresholds of the first network switch 116(1) and the second network switch 116(2) were exceeded, or fourth indications of a number of times quality of service (QoS) thresholds of the first network switch 116(1) and the second network switch 116(2) were exceeded.

At 408, the cloud computing network 102 may determine that the first network switch 116(1) is less constrained for the network resource than the second network switch 116(2) based at least in part on the first network parameter data 124 and the second network parameter data 124 (e.g., higher availability of TCAM, ACL list entries, routing table entries, less diagnostic constraint thresholds exceeded, less flow rate compared to maximum flow rate, etc.).

At 410, the cloud computing network 102 may determine that the virtual computing resource 120 is to be provisioned on the first server 118(1) based at least in part on the first network switch 116(1) being less constrained for the network resource than the second network switch 116(2).

In some examples, the method 400 further includes receiving a health status metric associated with the network resource or another network resource of the first network switch 116(1). The health status metric may indicate how health the first network switch 116(1) is with respect to network resources, such as availability of network resources, number of times diagnostic constraint thresholds have been violated, amount of traffic over links compared to maximum allowed traffic over the link, etc. Further, the method 400 may include determine that the health status metric is below a threshold, and based at least in part on the health status metric being below the threshold, move the virtual computing resource 120 from the first server 118(1) to the second server 118(2) or a third server 118(3).

FIG. 5 illustrates a flow diagram of an example method 500 for components of a cloud computing network 102 to deploy a virtual resource 120 on a server 118 based on server utilization data 122 and network parameter data 124. In some examples, the method 500 may be performed entirely by a scheduler (e.g., virtual workload orchestration component 104), or by a combination of components, services, platforms, processes, etc. (e.g., network analysis platform 106, virtual workload orchestration component 104, etc.).

At 502, the cloud computing network 102 may determine to provision a virtual computing resource 120 on a server 118, where the virtual computing resource 120 is configured to execute an instance of a service.

At 504, the cloud computing network 102 may obtain first server utilization data 124 indicating a first amount of a computing resource utilized by a first server 118(1). At 506, the cloud computing network 102 may obtain second server utilization data 124 indicating a second amount of the computing resource utilized by a second server 118(2).

At 508, the cloud computing network 102 may obtain, from a first network switch 116(1), first network parameter data 124 associated with a network resource of the first network switch 116(1) where the first network switch 116(1) is connected to the first server; 118(1).

At 510, the cloud computing network 102 may obtain, from a second network switch 116(2), second network parameter data 124 associated with the network resource of the second network switch 116(2) where the second network switch 116(2) is connected to the second server 118(2).

At 512, the cloud computing network 102 may select the first server 118(1), from among at least the first server 118(1) and second server 118(2), to host the virtual computing resource 120 based at least in part on the first server utilization data 122, the second server utilization data 122, the first network parameter data 124, and the second network parameter data 124. At 514, the cloud computing network 102 may cause the virtual computing resource to be provisioned on the first server.

Figure 6:
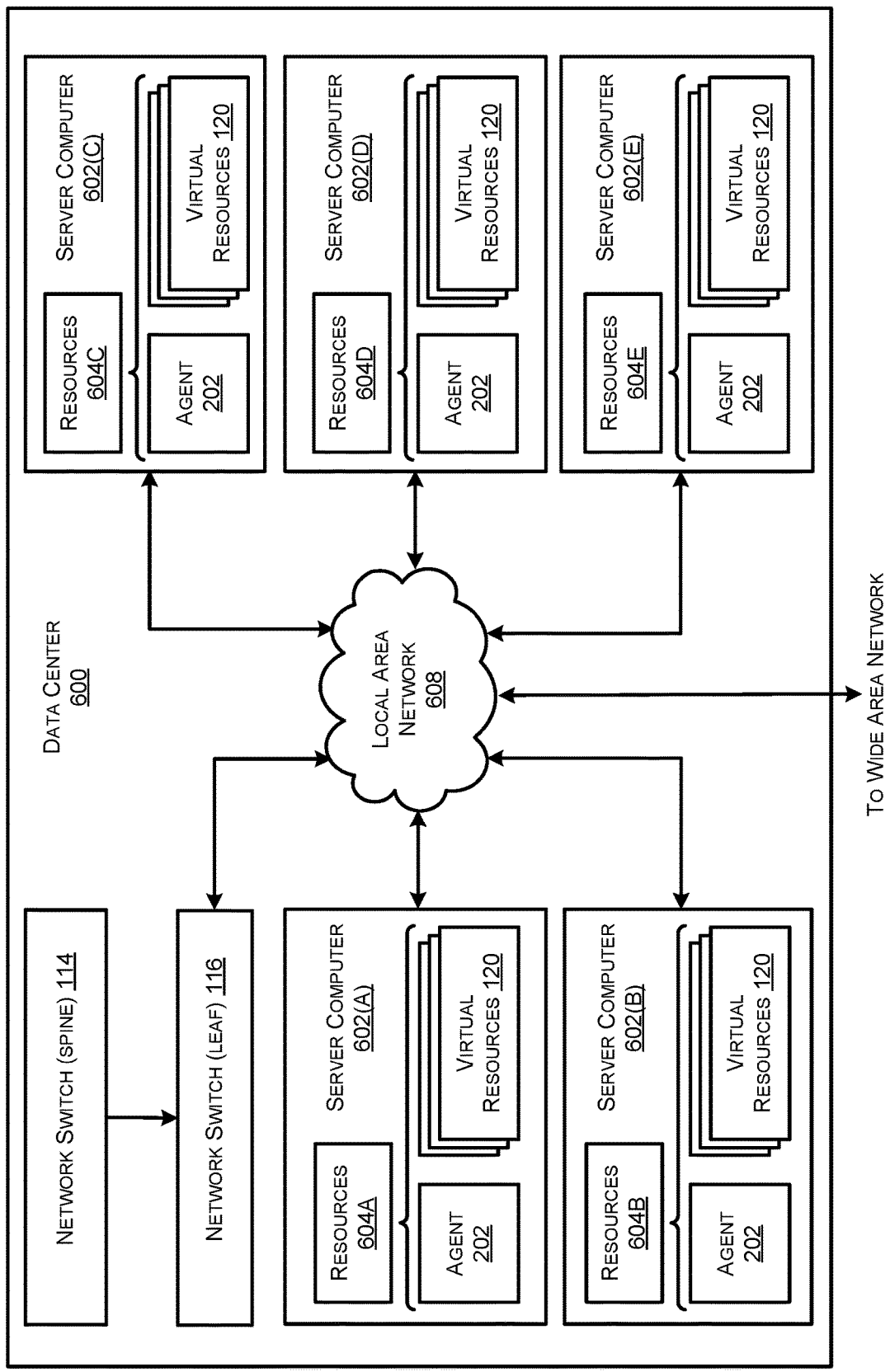
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602E (which might be referred to herein singularly as "a server computer 602" or in the plural as "the server computers 602") for providing computing resources. In some examples, the resources and/or server computers 602 may include, or correspond to, the servers 118 described herein.

The server computers 602 can be standard tower, rack-mount, or blade server computers configured appropriately for providing the computing resources described herein. As mentioned above, the computing resources provided by the cloud computing network 102 can be data processing resources such as VM instances or hardware computing systems, database clusters, computing clusters, storage clusters, data storage resources, database resources, networking resources, and others. Some of the servers 602 can also be configured to execute a resource manager capable of instantiating and/or managing the computing resources. In the case of VM instances, for example, the resource manager can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602E in each data center 600, and, potentially, between computing resources in each of the server computers 602. It should be appreciated that the configuration of the data center 600 described with reference to FIG. 6 is merely illustrative and that other implementations can be utilized.

As illustrated in FIG. 6, the server computers 602 may each execute one or more virtual resources 120 that support a service or application provisioned across a set or cluster of servers 602. The virtual resources 120 on each server computer 602 may support a single application or service, or multiple applications or services (for one or more users).

In some instances, the cloud computing network 102 may provide computing resources, like application containers, VM instances, and storage, on a permanent or an as-needed basis. Among other types of functionality, the computing resources provided by the cloud computing network 102 may be utilized to implement the various services described above. The computing resources provided by the cloud computing network 102 can include various types of computing resources, such as data processing resources like application containers and VM instances, data storage resources, networking resources, data communication resources, network services, and the like.

Each type of computing resource provided by the cloud computing network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network 102 can also be configured to provide other types of computing resources not mentioned specifically herein.

The computing resources provided by the cloud computing network 102 may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 6.

As illustrated, the data center 600 may include one or more spine network switches 114 connected to one or more leaf network switches 116. The leaf network switch 116 may be connected to the server computers 602 that support the virtual resources 120.

Figure 7:
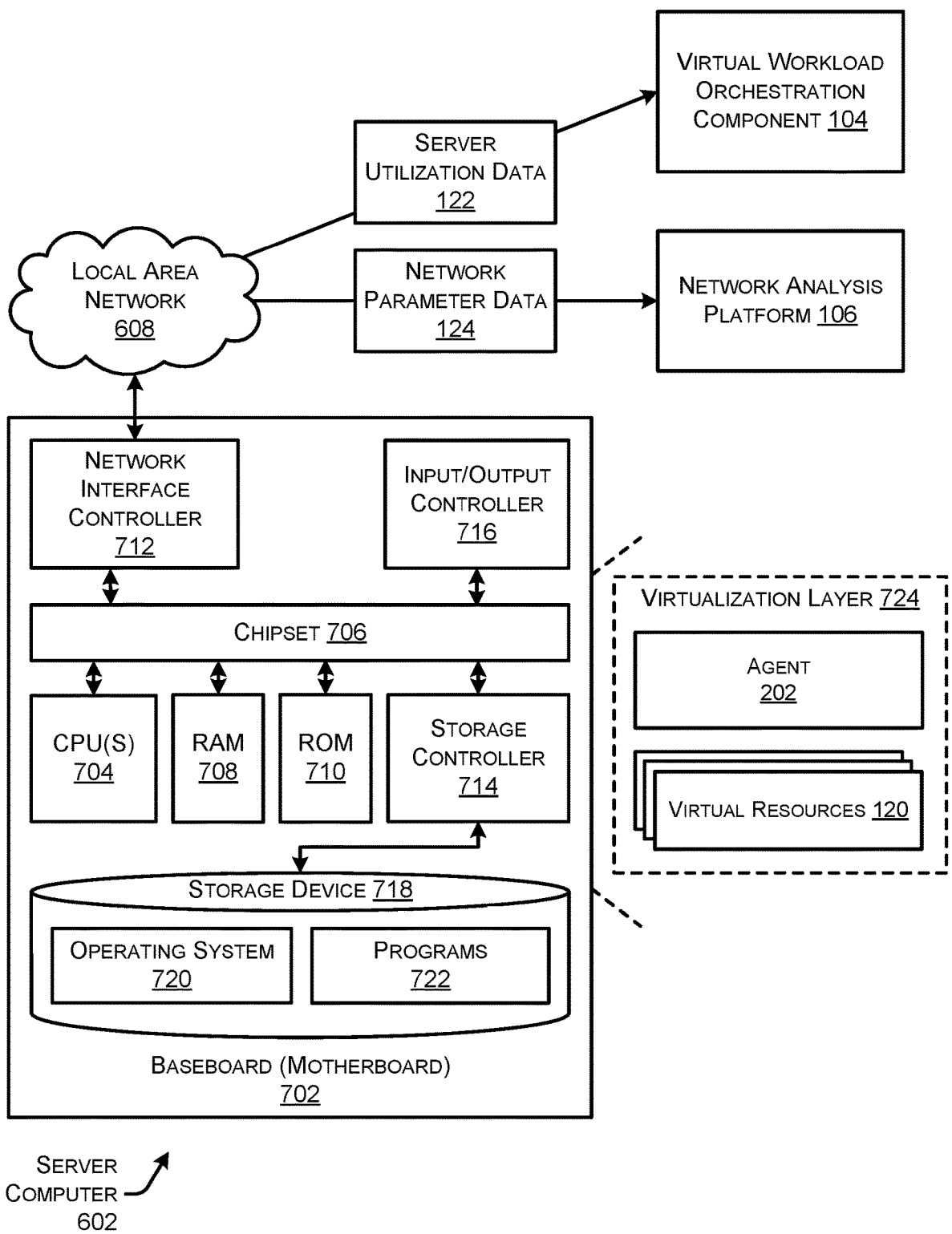
FIG. 7 is a computer architecture diagram showing an illustrative computer hardware architecture for implementing a server device that can be utilized to implement aspects of the various technologies presented herein.

FIG. 7 shows an example computer architecture for a server computer 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 602 may, in some examples, correspond to a physical server 118 described herein.

The computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the network 608. The chipset 706 can include functionality for providing network connectivity through a NIC 712, such as a gigabit Ethernet adapter. The NIC 712 is capable of connecting the computer 602 to other computing devices over the network 608 (or 130). It should be appreciated that multiple NICs 712 can be present in the computer 602, connecting the computer to other types of networks and remote computer systems.

The computer 602 can be connected to a storage device 718 that provides non-volatile storage for the computer. The storage device 718 can store an operating system 720, programs 722, and data, which have been described in greater detail herein. The storage device 718 can be connected to the computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 718 by detecting the physical states or characteristics of one or more particular locations within the physical storage units.

In addition to the mass storage device 718 described above, the computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 602. In some examples, the operations performed by the cloud computing network 102, and or any components included therein, may be supported by one or more devices similar to computer 602. Stated otherwise, some or all of the operations performed by the cloud computing network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 602.

In one embodiment, the storage device 718 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regard to FIGS. 1-6. The computer 602 can also include computer-readable storage media having instructions stored thereupon for performing any of the other computer-implemented operations described herein.

The computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

The server computer 602 may support a virtualization layer 724, such as one or more virtual resources 120 executing on the server computer 602. In some examples, the virtualization layer 724 may be supported by a hypervisor that provides one or more virtual machines running on the server computer 602 to perform functions described herein. The virtualization layer 724 may generally support a virtual resource that performs at least portions of the techniques described herein. The agent 202 may collect various data and provide it to components. For instance, the agent 202 may collect server utilization data 122 and provide it to the virtual workload orchestration component 104, and collect network parameter data 124 and provide it to the network analysis platform 106.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining that a virtual computing resource is to be provisioned on a server device, the virtual computing resource configured to execute an instance of a service;
   receiving server utilization data associated with at least a first server device and a second server device, that are each capable of hosting the virtual computing resource, the server utilization data indicative of whether the first server device is more or less constrained for a computing resource than the second server device;
   obtaining, from a first network switch device that is connected to the first server device, first network parameter data indicating utilization of a network resource of the first network switch device, the network resource utilized by the first network switch device to provide network connectivity to the first server device;
   obtaining, from a second network switch device that is connected to the second server device, second network parameter data indicating utilization of the network resource of the second network switch device, the network resource utilized by the second network switch device to provide network connectivity to the second server device;
   determining that the first network switch device is less constrained for the network resource than the second network switch device based at least in part on the first network parameter data and the second network parameter data; and
   based at least in part on the server utilization data indicating that the first server device is more constrained for the computing resource than the second server device and based at least in part on the first network switch device being less constrained for the network resource than the second network switch device, causing the virtual computing resource to be provisioned on the first server device.

2. The method of claim 1, wherein the first network parameter data and the second network parameter data comprise at least one of:

first indications of availability of content addressable memory (CAM) on the first network switch device and the second network switch device;
second indications of availability of entries in access control lists (ACLs) on the first network switch device and the second network switch device;
third indications of availability of routing table entries in routing tables on the first network switch device and the second network switch device; or
fourth indications of availability of buffered memory on the first network switch device and the second network switch device.

3. The method of claim 1, wherein the first network parameter data and the second network parameter data comprise at least one of:
first indications of a number of times memory constraint thresholds of the first network switch device and the second network switch device were exceeded;
second indications of a number of times interface error thresholds of the first network switch device and the second network switch device were exceeded;
third indications of a number of times buffer drop thresholds of the first network switch device and the second network switch device were exceeded; or
fourth indications of a number of times quality of service (QoS) thresholds of the first network switch device and the second network switch device were exceeded.

4. The method of claim 1, wherein:
the first network parameter data comprises a first utilization value representing a first amount of bandwidth between the first network switch device and the first server device utilized; and
the second network parameter data comprises a second utilization value representing a second amount of bandwidth between the second network switch device and the second server device utilized,
wherein determining that the first network switch device is less constrained for the network resource than the second network switch device comprises determining that the first utilization value is less than the second utilization value.

5. The method of claim 1, further comprising:
obtaining a first ranked list of servers that includes the first server device and the second server device, wherein the servers are ranked based at least in part on an availability of the computing resource; and
generating a second ranked list of servers based at least in part on the first ranked list, wherein the servers are ranked in the second ranked list based at least in part on respective ranks of the servers in the first ranked list, the first network parameter data, and the second network parameter data,
wherein determining that the virtual computing resource is to be provisioned on the first server device is based at least in part on the second ranked list.

6. The method of claim 1, further comprising:
receiving, from a scheduler, a first ranked list of servers that includes the first server device and the second server device, wherein the servers are ranked based at least in part on the server utilization data for each of the servers, the server utilization data comprising at least one of central processing unit (CPU) usage of the servers, memory usage of the servers, or storage usage of the servers;
generating a second ranked list of servers based at least in part on the first ranked list, the first network parameter data, and the second network parameter data; and providing the scheduler with the second ranked list of servers.

7. The method of claim 1, further comprising:
receiving a health status metric associated with the network resource or another network resource of the first network switch device;
determining that the health status metric is below a threshold; and
based at least in part on the health status metric being below the threshold, moving the virtual computing resource from the first server device to the second server device or a third server device.

8. A system comprising:
one or more processors; and
one or more non-transitory computer-readable media storing computer-executable instructions that, when executed by the one or more processors, cause the one or more processors to:
determine that a virtual computing resource is to be provisioned on a server device, the virtual computing resource configured to execute an instance of a service;
receiving server utilization data associated with at least a first server device and a second server device, that are each capable of hosting the virtual computing resource, the server utilization data indicative of whether the first server device is more or less constrained for a computing resource than the second server device;
obtain, from a first network switch device that is connected to the first server device, first network parameter data indicating utilization of a network resource of the first network switch device, the network resource utilized by the first network switch device to provide network connectivity to the first server device;
obtain, from a second network switch device that is connected to the second server device, second network parameter data indicating utilization of the network resource of the second network switch device, the network resource utilized by the second network switch device to provide network connectivity to the second server device;
determine that the first network switch device is less constrained for the network resource than the second network switch device based at least in part on the first network parameter data and the second network parameter data; and
based at least in part on the server utilization data indicating that the first server device is more constrained for the computing resource than the second server device and based at least in part on the first network switch device being less constrained for the network resource than the second network switch device, cause the virtual computing resource to be provisioned on the first server device.

9. The system of claim 8, wherein the first network parameter data and the second network parameter data comprise at least one of:
first indications of availability of content addressable memory (CAM) on the first network switch device and the second network switch device;
second indications of availability of entries in access control lists (ACLs) on the first network switch device and the second network switch device;
third indications of availability of routing table entries in routing tables on the first network switch device and the second network switch device; or fourth indications of availability of buffered memory on the first network switch device and the second network switch device.

10. The system of claim 8, wherein the first network parameter data and the second network parameter data comprise at least one of:
first indications of a number of times memory constraint thresholds of the first network switch device and the second network switch device were exceeded;
second indications of a number of times interface error thresholds of the first network switch device and the second network switch device were exceeded;
third indications of a number of times buffer drop thresholds of the first network switch device and the second network switch device were exceeded; or
fourth indications of a number of times quality of service (QoS) thresholds of the first network switch device and the second network switch device were exceeded.

11. The system of claim 8, wherein:
the first network parameter data comprises a first utilization value representing a first amount of bandwidth between the first network switch device and the first server device utilized;
the second network parameter data comprises a second utilization value representing a second amount of bandwidth between the second network switch device and the second server device utilized; and
to determine that the first network switch device is less constrained for the network resource than the second network switch device comprises to determine that the first utilization value is less than the second utilization value.

12. The system of claim 8, comprising further computer-executable instructions that, when executed by the one or more processors, cause the one or more processors to:
obtain a first ranked list of servers that includes the first server device and the second server device, wherein the servers are ranked based at least in part on the server utilization data for each of the servers, the server utilization data comprising at least one of central processing unit (CPU) usage of the servers, memory usage of the servers, or storage usage of the servers; and
generate a second ranked list of servers based at least in part on the first ranked list, the first network parameter data, and the second network parameter data,
wherein to determine that the virtual computing resource is to be provisioned on the first server device is based at least in part on the second ranked list.

13. The system of claim 8, comprising further computer-executable instructions that, when executed by the one or more processors, cause the one or more processors to:
receive, from a scheduler, a first ranked list of servers that includes the first server device and the second server device, wherein the servers are ranked based at least in part on the server utilization data for each of the servers, the server utilization data comprising at least one of central processing unit (CPU) usage of the servers, memory usage of the servers, or storage usage of the servers;
generate a second ranked list of servers based at least in part on the first ranked list, the first network parameter data, and the second network parameter data; and
provide the scheduler with the second ranked list of servers.

14. The system of claim 8, comprising further computer-executable instructions that, when executed by the one or more processors, cause the one or more processors to:
receive a health status metric associated with the network resource or another network resource of the first network switch device;
determine that the health status metric is below a threshold; and
based at least in part on the health status metric being below the threshold, move the virtual computing resource from the first server device to the second server device or a third server device.

15. A system comprising:
one or more processors; and
one or more non-transitory computer-readable media storing computer-executable instructions that, when executed by the one or more processors, cause the one or more processors to:
determine to provision a virtual computing resource on a server device of a cloud computing network, the virtual computing resource configured to execute an instance of a service;
obtain first server utilization data indicating a first amount of a computing resource utilized by a first server device of the cloud computing network, the first server device capable of hosting the virtual computing resource;
obtain second server utilization data indicating a second amount of the computing resource utilized by a second server device of the cloud computing network, the second server device capable of hosting the virtual computing resource;
obtain, from a first network switch device that is associated with the cloud-computing network and that is connected to the first server device, first network parameter data indicating utilization of a network resource of the first network switch device, the network resource utilized by the first network switch device to provide network connectivity to virtual computing resources hosted by the first server device;
obtain, from a second network switch device that is associated with the cloud computing network and that is connected to the second server device, second network parameter data indicating utilization of the network resource of the second network switch device, the network resource utilized by the second network switch device to provide network connectivity to virtual computing resources hosted by the second server device;
determine, based at least in part on the first server utilization data and the second server utilization data, that the first server device is more constrained for the computing resource than the second server device;
determine, based at least in part on the first network parameter data and the second network parameter data, that the first network switch device is less constrained for the network resource than the second network switch device;
determine, based at least in part on the first server device being more constrained for the computing resource than the second server device and based at least in part on the first network switch device being less constrained for the network resource than the second network switch device, that provisioning the virtual computing resource on the first server device would optimize communications of the cloud computing network; and
cause the virtual computing resource to be provisioned on the first server device based at least in part on the determination that provisioning the virtual computing resource on the first server device would optimize the communications of the cloud computing network.

16. The system of claim 15, wherein:
the first network parameter data and the second network parameter data comprise at least one of:
first indications of a number of times memory constraint thresholds of the first network switch device and the second network switch device were exceeded;
second indications of a number of times interface error thresholds of the first network switch device and the second network switch device were exceeded;
third indications of a number of times buffer drop thresholds of the first network switch device and the second network switch device were exceeded; or
fourth indications of a number of times quality of service (QoS) thresholds of the first network switch device and the second network switch device were exceeded.

17. The system of claim 15, wherein the first network parameter data and the second network parameter data comprise at least one of:
first indications of a number of times memory constraint thresholds of the first network switch device and the second network switch device were exceeded;
second indications of a number of times interface error thresholds of the first network switch device and the second network device switch were exceeded;
third indications of a number of times buffer drop thresholds of the first network switch device and the second network switch device were exceeded; or
fourth indications of a number of times quality of service (QoS) thresholds of the first network switch device and the second network switch device were exceeded.

18. The system of claim 15, wherein:
the first network parameter data comprises a first utilization value representing a first amount of bandwidth between the first network switch device and the first server device utilized; and
the second network parameter data comprises a second utilization value representing a second amount of bandwidth between the second network switch device and the second server device utilized.

19. The system of claim 15, wherein:
the first server utilization data and the second server utilization data comprise at least one of central processing unit (CPU) usage values for the first server device and the second server device, memory usage values for the first server device and the second server device, or storage usage values for the first server device and the second server device.

20. The system of claim 15, comprising further computer-executable instructions that, when executed by the one or more processors, cause the one or more processors to:
receive a health status metric associated with the network resource or another network resource of the first network switch device;
determine that the health status metric is below a threshold; and
based at least in part on the health status metric being below the threshold, move the virtual computing resource from the first server device to the second server device or a third server device.

* * * * *